(12) United States Patent
Horii

(10) Patent No.: US 9,105,261 B2
(45) Date of Patent: Aug. 11, 2015

(54) SOUND OUTPUTTING DEVICE

(75) Inventor: Seiji Horii, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 246 days.

(21) Appl. No.: 13/479,526

(22) Filed: May 24, 2012

(65) Prior Publication Data

US 2012/0300956 A1    Nov. 29, 2012

(30) Foreign Application Priority Data

May 27, 2011    (JP) .................................. 2011-119545

(51) Int. Cl.
*G10K 11/178* (2006.01)
*H04R 1/10* (2006.01)
*H04R 5/033* (2006.01)
(Continued)

(52) U.S. Cl.
CPC ............ *G10K 11/1786* (2013.01); *G02C 11/10* (2013.01); *H04R 1/1083* (2013.01); *H04R 5/033* (2013.01); *G10K 2210/1081* (2013.01); *G10K 2210/3028* (2013.01); *H04R 5/0335* (2013.01); *H04R 17/00* (2013.01); *H04R 25/43* (2013.01); *H04R 25/55* (2013.01); *H04R 25/606* (2013.01); *H04R 2225/31* (2013.01); *H04R 2460/01* (2013.01); *H04R 2460/13* (2013.01); *H04R 2499/11* (2013.01)

(58) Field of Classification Search
CPC ........ G02C 11/00; G02C 11/06; G02C 11/10; G02C 5/001; G10K 11/1786; G10K 2210/1081; G10K 2210/3028; H04R 1/1066; H04R 1/1083; H04R 5/033; H04R 5/0335; H04R 17/00; H04R 25/00; H04R 25/43; H04R 25/55; H04R 25/606; H04R 2460/13; H04R 2225/31; H04R 2499/11; H04M 1/05
USPC ......... 381/333, 334, 87, 91, 71.6, 151; 345/8; 351/158
See application file for complete search history.

(56) References Cited

U.S. PATENT DOCUMENTS 3,665,122 A * 5/1972 Weiss ............................ 381/326
5,635,948 A * 6/1997 Tonosaki .......................... 345/8
(Continued)

FOREIGN PATENT DOCUMENTS

JP     55147019 U     10/1980
JP     2001522063 A   11/2001
(Continued)

OTHER PUBLICATIONS

Office Action mailed Jul. 1, 2014, corresponds to Japanese patent application No. 2011-119545.
(Continued)

*Primary Examiner* — Vivian Chin
*Assistant Examiner* — Jason R Kurr
(74) *Attorney, Agent, or Firm* — Lowe Hauptman & Ham, LLP

(57) ABSTRACT

According to an aspect, a sound outputting device includes a front unit, a first side unit, a second side unit, a sound transmitting portion, and a piezoelectric speaker. The first side unit is coupled to one end portion of the front unit. The second side unit is coupled to another end portion of the front unit. The sound transmitting portion is provided in the first side unit for transmitting a sound via cartilage conduction. The piezoelectric speaker vibrates the sound transmitting portion.

22 Claims, 8 Drawing Sheets

(51) Int. Cl.
  *G02C 11/00* (2006.01)
  *H04R 17/00* (2006.01)
  *H04R 25/00* (2006.01)

(56) References Cited

U.S. PATENT DOCUMENTS

| | | | | |
|---|---|---|---|---|
| 6,480,174 | B1* | 11/2002 | Kaufmann et al. | 345/8 |
| 6,885,753 | B2* | 4/2005 | Bank | 381/326 |
| 7,278,734 | B2* | 10/2007 | Jannard et al. | 351/158 |
| 7,310,427 | B2* | 12/2007 | Retchin et al. | 381/380 |
| 7,580,540 | B2* | 8/2009 | Zurek et al. | 381/380 |
| 7,922,321 | B2* | 4/2011 | Howell et al. | 351/158 |
| 8,111,861 | B2* | 2/2012 | Lowry | 381/380 |
| 8,447,061 | B2* | 5/2013 | Lee | 381/380 |
| 8,842,870 | B2 | 9/2014 | East et al. | |
| 2006/0146277 | A1 | 7/2006 | Jannard et al. | |
| 2006/0197907 | A1 | 9/2006 | Jannard et al. | |
| 2006/0203183 | A1 | 9/2006 | Jannard et al. | |
| 2006/0203184 | A1 | 9/2006 | Jannard et al. | |
| 2007/0008484 | A1 | 1/2007 | Jannard | |
| 2008/0008344 | A1* | 1/2008 | Wakabayashi et al. | 381/327 |
| 2008/0089545 | A1 | 4/2008 | Jannard et al. | |
| 2009/0002626 | A1* | 1/2009 | Wakabayashi | 351/116 |
| 2009/0066910 | A1 | 3/2009 | Jannard et al. | |
| 2009/0086159 | A1 | 4/2009 | Jannard | |
| 2010/0238396 | A1 | 9/2010 | Jannard | |
| 2010/0265455 | A1 | 10/2010 | Jannard et al. | |
| 2010/0329485 | A1* | 12/2010 | Fukuda | 381/151 |
| 2011/0224481 | A1* | 9/2011 | Lee et al. | 600/25 |
| 2011/0255050 | A1 | 10/2011 | Jannard et al. | |
| 2012/0105740 | A1 | 5/2012 | Jannard et al. | |

FOREIGN PATENT DOCUMENTS

| | | |
|---|---|---|
| JP | 2005151292 A | 6/2005 |
| JP | 2005534269 A | 11/2005 |
| JP | 200628045 A | 2/2006 |
| JP | 2006157318 A | 6/2006 |
| JP | 2007104548 A | 4/2007 |
| JP | 2009-302815 A | 12/2009 |
| JP | 2010-528547 A | 8/2010 |
| WO | 2004012477 A2 | 2/2004 |
| WO | 2008/004273 A1 | 1/2008 |

OTHER PUBLICATIONS

Office Action mailed Nov. 11, 2014, corresponding to Japanese patent application No. 2011-119545.

* cited by examiner

SOUND OUTPUTTING DEVICE

CROSS-REFERENCE TO RELATED APPLICATIONS

This application claims priority from Japanese Application No. 2011-119545, filed on May 27, 2011, the content of which is incorporated by reference herein in its entirety.

BACKGROUND

1. Technical Field

The present disclosure relates to a sound outputting device (headset) that is configured to be mounted on user's head.

2. Description of the Related Art

Conventionally, eyeglass-shaped headsets using wireless communication have been disclosed (see for example, Japanese Patent Application National Publication (Laid-Open) No. 2005-534269).

Some headset is configured such that an earphone using a dynamic speaker is inserted into user's ear when he/she use the audio headset. Such a configuration may put a burden on his/her ear.

For the foregoing reasons, there is a need for a sound outputting device that reduces a burden on a user's ear.

SUMMARY

According to an aspect, a sound outputting device includes a front unit, a first side unit, a second side unit, a sound transmitting portion, and a piezoelectric speaker. The front unit is configured to be arranged in front of an eye of a user. The first side unit is configured to be coupled to one end portion of the front unit and to extend adjacent to one ear of the user. The second side unit is configured to be coupled to another end portion of the front unit and to extend adjacent to the other ear of the user. The sound transmitting portion is provided in at least one of the first side unit and the second side unit and is configured to come in contact with the user. The piezoelectric speaker vibrates the sound transmitting portion so as to transmit a sound to the user.

According to another aspect, a sound outputting device includes a front unit, a first side unit, a second side unit, a sound transmitting portion, and a piezoelectric speaker. The first side unit is coupled to one end portion of the front unit. The second side unit is coupled to another end portion of the front unit. The sound transmitting portion is provided in the first side unit for transmitting a sound via cartilage conduction. The piezoelectric speaker vibrates the sound transmitting portion.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

Figure 1:
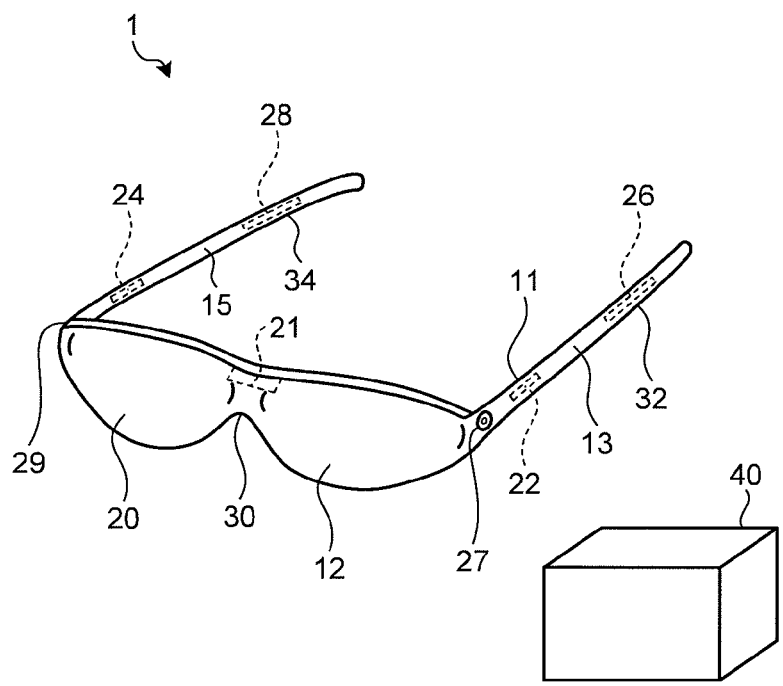
FIG. 1 is a perspective view illustrating a schematic configuration of an image and sound output system including a sound outputting device according to an embodiment.
Figure 2:
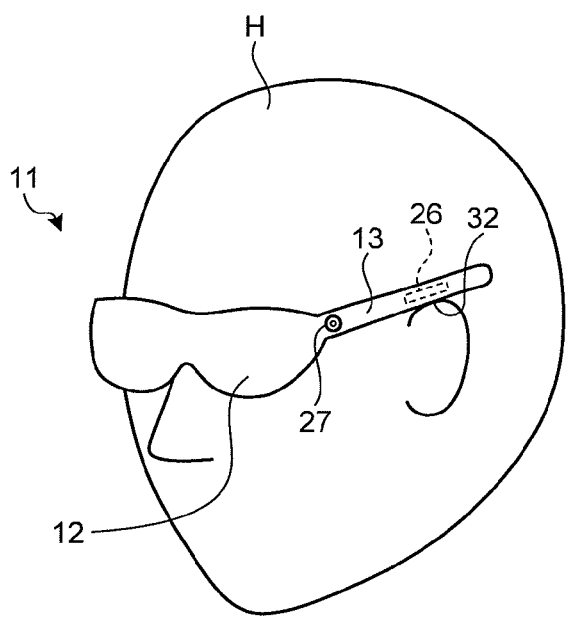
FIG. 2 is an explanatory perspective view illustrating the sound outputting device mounted on a user.

FIG. 1 is a perspective view illustrating a schematic configuration of an image and sound output system 1 including a sound outputting device according to an embodiment. FIG. 2 is an explanatory perspective view illustrating a sound outputting device 11 mounted on user H. The image and sound output system 1 in FIG. 1 includes the sound outputting device 11 and a control unit 40. The image and sound output system 1 according to the embodiment represent an example of a system in which a head-mounted display is used as a sound outputting device. The head-mounted display provides a user with images (videos, moving images, and still images) in addition to sounds. That is, the sound outputting device 11 according to the embodiment outputs sounds to the user wearing the sound outputting device 11 while displaying images.

In the image and sound output system 1, wireless or wired communication is performed between the sound outputting device 11 and the control unit 40, so that sound information to be output from the control unit 40 is supplied from the control unit 40 to the sound outputting device 11. The sound outputting device 11 processes sound information supplied from the control unit 40 so as to output sounds, thus outputting the sounds to the user. In the image and sound output system 1, wireless or wired communication is performed between the sound outputting device 11 and the control unit 40, so that image information to be displayed is supplied from the control unit 40 to the sound outputting device 11. The sound outputting device 11 processes the image information supplied from the control unit 40 so as to display images, thus displaying the images to the user.

As illustrated in FIG. 1, the sound outputting device 11 is eyeglass-shaped (goggle-shaped), and includes a front unit 12, a side unit 13, and another side unit 15. When the sound outputting device 11 is mounted on the user H, the front unit 12 is located in front of the user H's eyes, and the side units 13 and 15 are located along respective temporal regions of the user H as illustrated in FIG. 2.

The front unit 12 is a unit that is located in front of the user H's eyes when mounted on the user H as described above. The front unit 12 includes a front supporting portion 30, which is formed at one end of the center portion of the front unit 12 and comes in contact with the user H's nose when mounted. The front supporting portion 30 has a recess shape along the user H's nose. The front unit 12 is supported at the front supporting portion 30 by the nose. Thus, the sound outputting device 11 can be supported not to fall downward in FIG. 2 (downward direction of the head). The front unit 12 includes a display unit 20 arranged in such a manner that an image is displayed over approximately the whole region of the front unit 12. The front unit 12 also includes a display controller 21 that generates an instruction signal for displaying an image on the display unit 20. The display controller 21 according to the embodiment is arranged in the end opposite to the front supporting portion 30 at the center portion of the front unit 12.

The side unit 13 is a unit (glasses leg portion) that is arranged along a temporal region of the user H when mounted on the user H as described above. The side unit 13 has one end portion that is coupled to one end portion of the front unit 12. At the end portion (a root portion of the glasses leg) of the side unit 13, which is coupled to the front unit 12, a spring for pressure adjustment and an adjuster for changing the angle are arranged to fit the user H. The side unit 13 includes a side supporting portion 32 that is formed so as to come in contact with a part of an upper side of the user H's ear when mounted. The side supporting portion 32 according to the embodiment also comes in contact with the temporal region of the user H. The side unit 13 is supported at the side supporting portion 32 supported by the ear. Thus, the sound outputting device 11 can be supported not to fall downward in FIG. 2 (a downward direction of the head). The side supporting portion 32 is supported at the side supporting portion 32 by the ear. Thus, the sound outputting device 11 can be supported not to move in a lateral direction (a front-back direction of the head) in FIG. 2.

The side unit 13 includes a control unit 22, a piezoelectric speaker 26, and a microphone 27. The control unit 22 is arranged inside the side unit 13. The control unit 22 will be described later. The piezoelectric speaker 26 is a speaker that uses a natural mechanical resonance phenomenon of piezoelectric ceramics. The piezoelectric speaker 26 is arranged adjacent to the side supporting portion 32 inside the side unit 13. In the embodiment, the piezoelectric speaker 26 is a sound outputting unit that vibrates a part of the side unit 13 in contact with the user H so as to transmit sounds to the user H. That is, the piezoelectric speaker 26 transmits sound to a human body via cartilage conduction, thus allowing the user H to listen to voices and music. Specifically, the piezoelectric speaker 26 is configured such that a part of the side unit 13 where the piezoelectric speaker 26 is arranged is brought into contact with a cartilage adjacent to the ear, and thereby vibrations are transmitted to an eardrum so as to allow the user H to recognize sounds. The piezoelectric speaker 26 is rod-shaped (for example, with a width of 3 mm, a length of 25 mm, and a thickness of 0.5 mm). The rod-shaped piezoelectric speaker 26 is arranged to have the longer side direction along the extending direction of the side unit 13 (that is, in a direction where the longer side direction of the vibrator and the extending direction of the side unit 13 are approximately the same direction). Since the piezoelectric speaker 26 has such a small and thin rod-shape, it is suitable to be mounted in the side unit 13 (a part of the glasses leg) of the eyeglass-shaped sound outputting device 11.

The microphone 27 is a sound collecting microphone that collects a voice from the user H and sounds of his/her surroundings. The microphone 27 is arranged in the end portion at the front unit 12 side of the side unit 13 facing the opposite side (the same direction as that of the external auditory canal of the user H's ear) of the user H. The microphone 27 is arranged in the end portion at the front unit 12 side of the side unit 13, which is the position far from the position (near the ear) where the piezoelectric speaker 26 is located. Accordingly, the influence of the piezoelectric speaker 26 is reduced.

The side unit 15 is a unit (glasses leg portion) that is arranged along a temporal region of the user H when mounted on the user H as described above. The side unit 15 has one end portion that is coupled to the other end portion of the front unit 12. That is, the side unit 15 is arranged in a position to face the side unit 13 via the front unit 12. Similarly to the side unit 13, at the end portion (a root portion of the glasses leg) of the side unit 15 coupled to the front unit 12, a spring for pressure adjustment and an adjuster for changing the angle are arranged. The side unit 15 includes a side supporting portion 34 that is formed so as to come in contact with a part of the upper side of the user H's ear when mounted. The side supporting portion 34 according to the embodiment also comes in contact with the temporal region of the user H. The side unit 15 is supported at the side supporting portion 34 supported by the ear. Thus, the sound outputting device 11 can be supported not to fall downward of the head. The side supporting portion 34 is supported at the side supporting portion 34 by the ear. Thus, the sound outputting device 11 can be supported not to move in the front-back direction of the head.

The side unit 15 includes a power supply unit 24, a piezoelectric speaker 28, and a microphone 29. The power supply unit 24 is arranged inside the side unit 15. The power supply unit 24 will be described later. The piezoelectric speaker 28 is a speaker that uses a natural mechanical resonance phenomenon of piezoelectric ceramics. The piezoelectric speaker 28 is arranged adjacent to the side supporting portion 34 inside the side unit 15. The microphone 29 is a sound collecting microphone that collects a voice from the user H and sounds of his/her surroundings. The microphone 29 is arranged in the end portion at the front unit 12 side of the side unit 15 facing the opposite side (the same direction as that of the external auditory canal of the user H's ear) of the user H. The piezoelectric speaker 28 and the microphone 29 are otherwise similar to the piezoelectric speaker 26 and the microphone 27 respectively in basic configurations except for their arrangement. Therefore, these configurations will not be further elaborated here. In the embodiment, the image and sound output system 1 may include a mobile phone as the control unit 40. If the control unit 40 is a mobile phone, sounds collected by the microphone 29 are transmitted to the control unit 40 through a communication unit 22e described later, and thus communication with another mobile phone is allowed. In this case, the sound outputting device 11 may include a notification switch to control on and off of a phone call of, for example, a mobile phone in an arbitrary position. Incidentally, a part of a circuit (a substrate), which is coupled to the power supply unit 24 and not illustrated in the drawings, for driving the power supply unit 24 is arranged inside the side unit 15 (inside the glasses leg). The power supply unit 24 has a function that will be described in detail below with reference to FIG. 4.

Figure 3A:
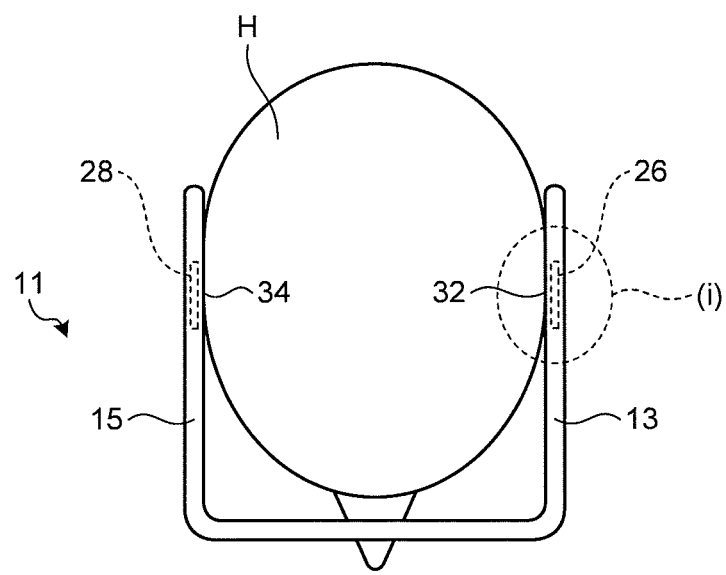
FIG. 3A is an explanatory top view illustrating the sound outputting device mounted on the user.
Figure 3B:
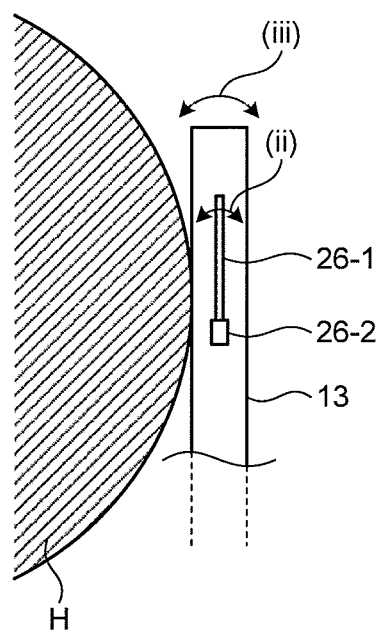
FIG. 3B is a transparent view of a side unit of the sound outputting device illustrating a vibration direction of a piezoelectric speaker arranged inside the side unit.

A vibration direction of the piezoelectric speaker will be described with reference to FIGS. 3A and 3B, using an example of the piezoelectric speaker 26 which is arranged in the side unit 13 of the sound outputting device 11. FIG. 3A is an explanatory top view illustrating the sound outputting device 11 mounted on the user H. FIG. 3B is a transparent view of the side unit 13 illustrating a vibration direction of the piezoelectric speaker 26 arranged inside the side unit 13. Although a description will be made with respect to the piezoelectric speaker 26, the piezoelectric speaker 28 has a similar configuration.

As illustrated in FIG. 3A, when the sound outputting device 11 is mounted on the user H, the temporal regions of the user H come in contact with parts of the side units 13 and 15 (in FIG. 3A, parts of the side units 13 and 15 near the side supporting portions 32 and 34 around which the piezoelectric speakers 26 and 28 are respectively arranged). For example, as illustrated in FIG. 3B, which is an enlarged diagram of (i) in FIG. 3A, the piezoelectric speaker 26 moves a part of the side unit 13 (a part of a surface of the side unit 15 side, a sound transmitting portion). This part, which is in contact with the user H, is moved alternately to a direction to approach the user H (a direction to approach the side unit 15) and to a direction to separate from the user H (a direction to move away from the side unit 15). Accordingly, the piezoelectric speaker 26 vibrates this part of the side unit 13 (the sound transmitting portion) in a direction perpendicular to a surface region contacting the user. As illustrated in FIG. 3B, which is a transparent view of the part of the side unit 13 in FIG. 3A, the piezoelectric speaker 26 includes a vibrator 26-1 and an electrode unit 26-2. The electrode unit 26-2 functions as a stator to secure the vibrator 26-1 and controls vibration with piezoelectricity. A part (for example, a sound signal generator 22c described below) of a circuit (a substrate), which is coupled to the piezoelectric speaker 26 and not illustrated in the drawings, for driving the piezoelectric speaker 26 is arranged inside the side unit 13 (inside the glasses leg). In the embodiment, the piezoelectric speaker 26 is mounted by a fixing method to efficiently transmit vibration. Thus, the piezoelectric speaker 26 moves the vibrator 26-1 in the direction (the direction to approach the user H or the direction to move away from the user H) as illustrated in (ii) of FIG. 3B. The piezoelectric speaker 26 also vibrates the part of the side unit 13 in contact with the user H to the direction (the direction to approach the user H or the direction to move away from the user H) as illustrated in (iii) of FIG. 3B. Thus, the piezoelectric speaker 26 transmits sounds to the user H.

Figure 4:
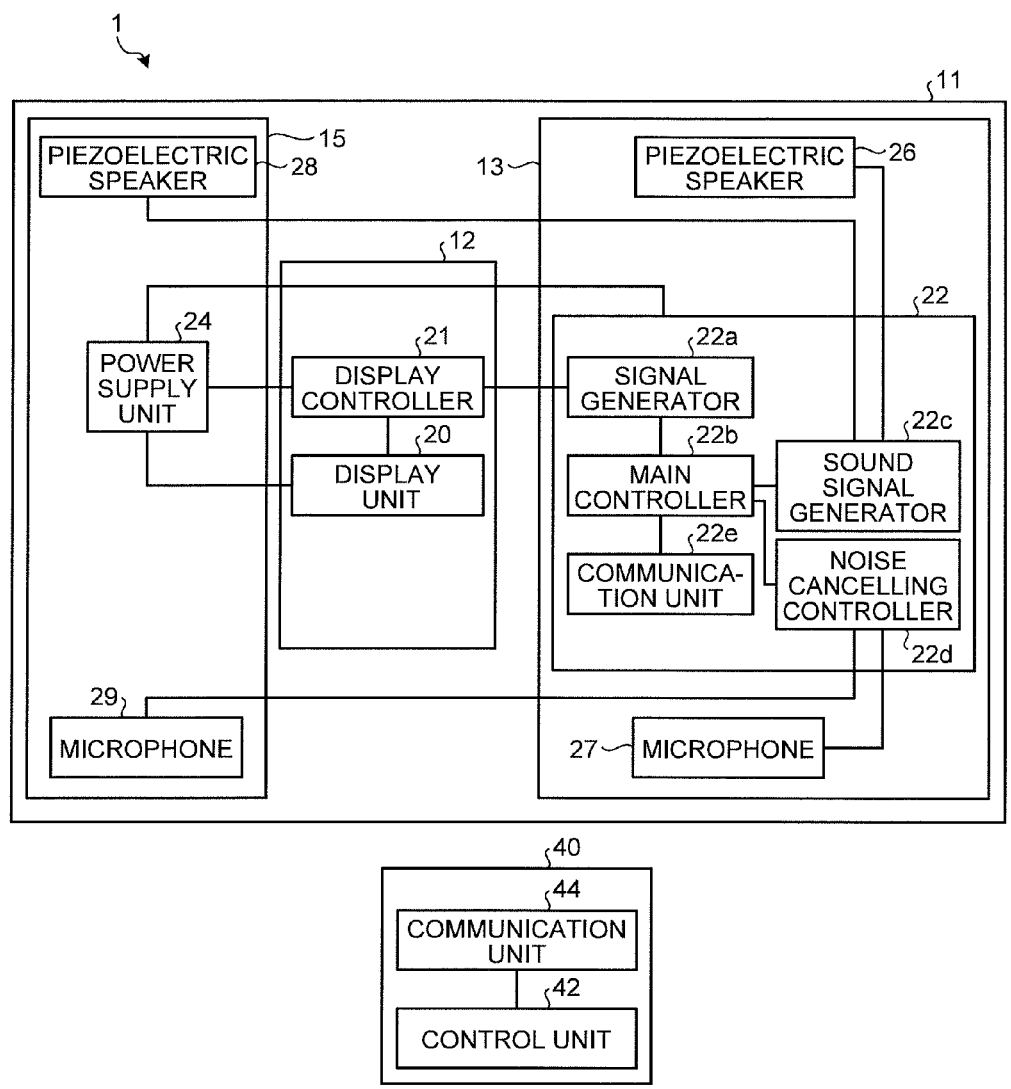
FIG. 4 is a block diagram illustrating a schematic functional configuration of the image and sound output system in FIG. 1.

Then, functions of the image and sound output system 1 will be described using FIG. 4. FIG. 4 is a block diagram illustrating a schematic functional configuration of the image and sound output system in FIG. 1. The image and sound output system 1 includes the sound outputting device 11 and the control unit 40 as described above. The sound outputting device 11 includes the display unit 20, the display controller 21, the control unit 22, the power supply unit 24, the piezoelectric speakers 26 and 28, and the microphones 27 and 29. The display unit 20 and the display controller 21 are arranged in the front unit 12. The control unit 22, the piezoelectric speaker 26, and the microphone 27 are arranged in the side unit 13. The power supply unit 24, the piezoelectric speaker 28, and the microphone 29 are arranged in the side unit 15.

The display unit 20 is a display panel that displays videos and images based on control by the display controller 21. As the display unit 20, for example, display panel that is constituted of an LCD (Liquid Crystal Display) or an OELD (Organic Electro-Luminescence Display) may be used. The display unit 20 may include a display panel constituted of a translucent or transparent plate-shaped material. The display unit 20, which includes the display panel fabricated with the translucent or transparent plate-shaped material, allows the user H to see a view outside of a region covered with the display unit 20. Thus, the user H is allowed to understand situations of his/her surroundings even when the sound outputting device 11 is mounted.

The display unit 20 may include any kinds of configuration insofar as the display unit 20 displays images that are viewable for the user H, that is, the image is represented to the user H. For example, for the display unit 20, a configuration that projects an image on a display panel (a screen) like a projector may be employed. In the case where the image is projected, a laser light may be scanned to project an image, or a light may be transmitted through a LCD to project an image. A laser light may be directly irradiated to the user H from the display unit 20 so as to display the images for the user H.

The display controller 21 controls operation of the display unit 20 based on an image signal supplied from the control unit 22. For example, in the case where the display unit 20 includes an LCD display, the display controller 21 controls voltages to be applied, thus controlling on and off of the respective liquid crystal elements.

The control unit 22 includes a signal generator 22a, a main controller 22b, a sound signal generator 22c, a noise cancelling controller 22d, and a communication unit 22e. The signal generator 22a is a processing unit that generates a signal to be supplied to the display controller 21. When the signal generator 22a obtains data of images or moving images to be displayed on the display unit 20, the signal generator 22a converts the obtained data into a signal that can be processed by the display controller 21, and sends the converted signal to the display controller 21.

The main controller 22b is constituted of, for example, an MPU (Micro Processing Unit), and executes various kinds of processings of the above-described sound outputting device 11 in accordance with a procedure instructed by software. That is, the main controller 22b sequentially reads instruction codes from operating system programs and application programs and the like, thus executing processings. Accordingly, the main controller 22b controls operation of respective units, transmits necessary data for respective units. For example, the main controller 22b sends image data to the signal generator 22a, and sends a sound signal to the sound signal generator 22c.

The control unit 22 includes a storage unit that stores various kinds of programs. The storage unit includes one or more non-transitory storage medium, for example, a nonvolatile memory (such as ROM, EPROM, flash card etc.) and/or a storage device (such as magnetic storage device, optical storage device, solid-state storage device etc.). The storage unit may further include a memory device (for example, SRAM (Static Random Access Memory) and DRAM (Dynamic Random Access Memory)).

The sound signal generator 22c executes processing of the sound signal output from the piezoelectric speakers 26 and 28. That is, the sound signal generator 22c executes processing such as decoding, DA conversion (Digital Analog conversion), and amplification on the sound data sent from the main controller 22b, thus converting the sent data to an analog sound signal. The sound signal generator 22c then outputs the analog sound signal to the piezoelectric speakers 26 and 28.

The noise cancelling controller 22d controls noise cancellation by providing a sound signal in the opposite phase of a sound obtained by the microphones 27 and 29, to the piezoelectric speakers 26 and 28. That is, the noise cancelling controller 22d, which is coupled to the microphones 27 and 29, realizes the noise-cancelling function in conjunction with the sound signal generator 22c, which controls the piezoelectric speakers 26 and 28. The noise cancelling controller 22d adds a sound in the opposite phase of the ambient noise obtained by the microphones 27 and 29 to a reproduced sound, and the added sound is input to the piezoelectric speakers 26 and 28, thus reducing the ambient noise. That is, the noise cancelling controller 22d radiates the sound wave in the opposite phase of the sound noise, which is collected by the microphones 27 and 29, with the piezoelectric speakers 26 and 28, thus canceling or reducing the ambient noise. When the noise cancelling controller 22d performs the noise cancellation, the noise cancelling controller 22d may be adjusted so as not to perform noise cancellation of a sound in a frequency such as a frequency of human voice. The noise cancelling controller 22d is configured to select from modes such as a mode that equally performs noise cancellation to remove ambient noise and a mode that adjusts attenuation rate at specific frequency. The noise cancelling controller 22d adjusts a sound to be output from the piezoelectric speakers 26 and 28 based on sound collected with the microphones 27 and 29 depending to the selected mode.

The communication unit 22e communicates with the communication unit 44 of the control unit 40, which will be described below, by wired or wireless connection. The communication unit 22e communicates with the control unit 40 so as to transmit and receive various kinds of information. In the case of wireless connection, a system such as Wi-Fi and Bluetooth (registered trademark) may be employed. An antenna and a charging terminal used for wireless connection may be disposed at an arbitrary position in the sound outputting device 11. In the case of wired connection, for example, a transmission using a standard such as USB (Universal Serial Bus), HDMI (High-Definition Multimedia Interface) may be employed, or a transmission through an earphone jack may be employed. In the case of wired connection, electric power may be supplied through a wire. In this case, the wire may be disposed at any position of the sound outputting device 11.

The communication unit 22e may be configured to communicate with a communication device other than the control unit 40. The communication unit 22e may establish a wireless signal path using a code-division multiple access (CDMA) system, or any other wireless communication protocols, with a base station via a channel allocated by the base station, and may perform telephone communication and information communication with the base station.

The power supply unit 24 is a supply source to supply electric power and supplies electric power to respective function units of the sound outputting device 11 including the control unit 22. The power supply unit 24 may use a rechargeable battery (a battery) or a replaceable and disposable dry cell battery as the supply source. In the embodiment, as the power supply unit 24, a solar cell or a fuel cell or the like may be mounted on a frame or a leg part of glasses (for example, the front unit 12, or the side unit 13 or 15 of the sound outputting device 11). For example, in the case where the solar cell is mounted, the solar cell can efficiently receive sunlight because the sound outputting device 11 is mounted on a head. In the case where the fuel cell is mounted, the fuel cell can efficiently take in external air and can efficiently discharge generated water vapor. The sound outputting device 11 may include an electric power supply switch to control on and off of electric power supply by the power supply unit 24 in any position.

The piezoelectric speakers 26 and 28 are sound outputting units that output sounds based on the analog sound signal supplied from the sound signal generator 22c. Specifically, as illustrated in FIGS. 3A and 3B, the piezoelectric speakers 26 and 28 vibrate respective parts of the side units 13 and 15 in contact with the user H based on the analog sound signal supplied from the sound signal generator 22c, thus transmitting sounds to the user H. More specifically, the piezoelectric speakers 26 and 28 vibrate the parts of the side units 13 and 15 in contact with the user H (the end portions at the opposite side of the front unit 12 in the side units 13 and 15) to the direction to approach the user H (the direction where the side units 13 and 15 face one another with the front unit 12 between them) and to the direction to separate from the user H (the same direction as that of the external auditory canal of the user H's ear). The sound outputting device 11 may include a volume control switch to adjust sound volume of the piezoelectric speakers 26 and 28 in any position.

The control unit 40 includes a control unit 42 and a communication unit 44. The control unit 42 is constituted of, for example, an MPU (Micro Processing Unit) and executes various kinds of processings in accordance with a procedure instructed by software. That is, the control unit 42 sequentially reads instruction codes from operating system programs, application programs, and the like, thus executing processings. Accordingly, the control unit 42 controls operation of respective units and sends necessary data for respective units. For example, the control unit 42 sends video data, moving image data, and information on various control instructions, which are to be sent to the sound outputting device 11, to the communication unit 44.

The communication unit 44 communicates with the communication unit 22e of the sound outputting device 11 by wired or wireless connection. The communication unit 44 communicates with the sound outputting device 11 so as to transmit and receive various kinds of information. The communication unit 44 may be configured, similarly to the communication unit 22e, to communicate with a communication device other than the sound outputting device 11.

As described above, with the image and sound output system 1 according to the embodiment, the control unit 40 transmits, for example, sound data and video data to be output to the sound outputting device 11. The sound outputting device 11 processes the data so as to provide sounds and images to the user H, who wears the sound outputting device 11. Thus, the user H is allowed to listen to sounds and see images. Specifically, when the sound outputting device 11 obtains sound data, video data, and the like through a communication between the communication unit 22e and the communication unit 44 of the control unit 40, the sound outputting device 11 processes the data at the main controller 22b to transmit sound data to the sound signal generator 22c and transmit the image data to the signal generator 22a. The sound signal generator 22c performs processing on sound data and sends a generated signal to the piezoelectric speakers 26 and 28. Then the piezoelectric speakers 26 and 28 output sounds based on the supplied signal. Thus, the image and sound output system 1 according to the embodiment outputs sounds to the user H. Further, the signal generator 22a generates a signal that can be processed by the display controller 21 based on image data sent from the main controller 22b, and sends the generated signal to the display controller 21. The display controller 21 then controls operation of the display unit 20 based on the signal. Thus, the image and sound output system 1 according to the embodiment displays an image of the image data on the display unit 20 for the user H.

The image and sound output system 1 and the sound outputting device 11 according to the embodiment include the rod-shaped piezoelectric speakers 26 and 28 arranged in the side units 13 and 15 so as to transmit sounds via cartilage conduction, thus reducing a burden on the user H's ear when used. That is, the image and sound output system 1 and the sound outputting device 11 according to the embodiment do not insert protuberance such as an earphone into the user H's ear. This configuration ensures a comfortable use without feel of mounting and improves design, ease of attachment and detachment, and sound quality.

The image and sound output system 1 and the sound outputting device 11 according to the embodiment transmits sounds to the cartilage of the user H with the piezoelectric speakers 26 and 28, thus suitably transmitting sounds. In the image and sound output system 1 according to the embodiment, the sound outputting device 11 is supported at the side supporting portions 32 and 34 of the side units 13 and 15, and transmits sounds with the piezoelectric speakers 26 and 28. This configuration ensures transmission of sounds and support by the ears without covering ear holes. Accordingly, the user H is allowed to use the sound outputting device 11 while hearing sounds outside.

The image and sound output system 1 and the sound outputting device 11 according to the embodiment include the microphones 27 and 29 in the side units 13 and 15. A sound signal in the opposite phase of the sound collected by the microphones 27 and 29 is supplied to the piezoelectric speakers 26 and 28. This configuration ensures the noise-cancelling function, thus reducing ambient sound without covering the external auditory canals of the user H's ears.

The image and sound output system 1 and the sound outputting device 11 may include, in addition to the above configuration, various configurations ordinarily used for the image and sound output systems and the sound outputting devices. The image and sound output system 1 and the sound outputting device 11 may include, for example, an operating unit into which the user H inputs operations. The operating unit may be disposed in the sound outputting device 11 or separately disposed. In the case where the operating unit is separately disposed, operations may be input by communicating with the communication unit 22e or the communication unit 44.

The sound outputting device 11 according to the embodiment is equipped with the display unit 20 in the front unit 12 as a head-mounted display to display image. However, the configuration of the sound outputting device 11 is not limited thereto. The sound outputting device 11 may be equipped with lenses of glasses or sunglasses in the front unit 12 insofar as the sound outputting device 11 is eyeglass-shaped.

The sound outputting device 11 according to the embodiment is configured such that the power supply unit 24 is arranged in the side unit 15, at which the control unit 22 is not arranged, among the two side units 13 and 15. However, the configuration of the sound outputting device 11 is not limited thereto. The power supply unit 24 may be arranged in both of the side units 13 and 15. The sound outputting device 11 may be configured such that the control unit 22 is partially arranged in the side unit 15. The sound outputting device 11 may be configured such that the control unit 22 and the power supply unit 24 is arranged so as to equalize weights of the side units 13 and 15. The equalized weights reduce a burden on the user H when used. In the embodiment, a part (for example, the sound signal generator 22c) of the circuit (a substrate) for driving the piezoelectric speakers 26 and 28 is arranged inside (inside the glasses leg) the side units 13 and 15. However, the configuration of the sound outputting device 11 is not limited thereto. The circuit may be mounted in a housing other than the side units 13 and 15 and wired. Each of the side units 13 and 15 may be constituted as a single unit to attach and remove to the front unit 12 so as to design the light sound outputting device 11. The side supporting portions 32 and 34 may have a recess shape along the user H's ear.

In the above embodiment, the sound outputting device 11 is described as an exemplary head-mounted display; however, the sound outputting device 11 may not include the display unit 20 such as an LCD in the front unit 12. For example, the sound outputting device 11 may arrange lenses of glasses or sunglasses in the front unit 12 and is constituted as a glasses-type hearing aid that includes a noise-cancelling function.

In the above embodiment, the sound outputting device 11 includes the exemplary side units 13 and 15 in the simplest form that places importance on design as illustrated in FIG. 1. The form of the side units 13 and 15 is not limited to this form.

The following describes exemplary forms of the side units 13 and 15 that appropriately transmit sounds to user H via cartilage conduction with reference to FIGS. 5 to 10.

Figure 5:
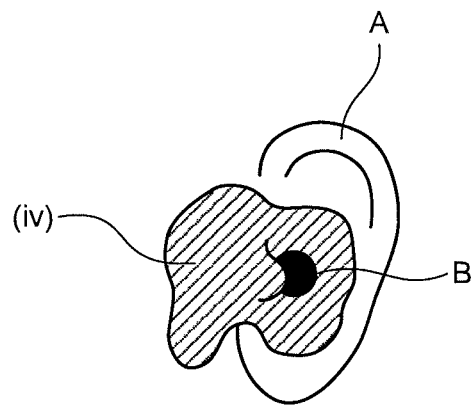
FIG. 5 is an explanatory view illustrating an appropriate range for cartilage conduction around an external auditory canal of the user's ear.

FIG. 5 is an explanatory view illustrating an appropriate range (iv) for cartilage conduction around an external auditory canal B of the user H's ear A. FIGS. 6 to 9 are explanatory side views illustrating sound outputting devices according to other embodiments mounted on user H. FIG. 10 is a perspective view illustrating a schematic configuration of a sound outputting device according to another embodiment.

The region (iv) in FIG. 5 illustrates a region where the side units 13 and 15 with the piezoelectric speakers 26 and 28 partially contact the respective cartilages around the external auditory canal B of the user's ear A. When the region of (iv) in FIG. 5 is brought into contact with a part of the side units 13 and 15 with the piezoelectric speakers 26 and 28, a sound pressure and frequency characteristic are improved. That is, bringing the region of (iv) in FIG. 5 into contact with a part of the side units 13 and 15 improves sound quality.

Figure 6:
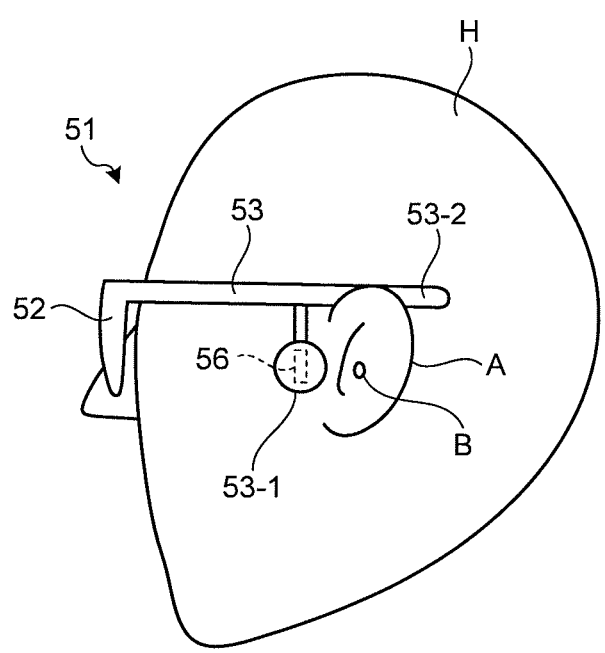
FIG. 6 is an explanatory side view illustrating a sound outputting device according to another embodiment mounted on a user.

A sound outputting device 51 in FIG. 6 is eyeglass-shaped and includes a front unit 52 and a side unit 53 coupled to one end portion of the front unit 52. Further, the side unit 53 branches at a position anterior to a portion supported by an ear A (that is, in a shape where the end portions at the far side from the front unit 52 branch into two at the position anterior to the ear A). The side unit 53 branches in directions away from the front unit 52. One branched end portion 53-1 includes a piezoelectric speaker 56. The other branched end portion 53-2 includes the side supporting portion. The side unit 53 is supported at the other end portion 53-2 by the ear A. One end portion 53-1 has a round shape that largely contacts a region (the region of (iv) in FIG. 5) suitable for cartilage conduction around the external auditory canal B of user H's ear A. Therefore, the piezoelectric speaker 56 arranged in the one end portion 53-1 suitably transmits sounds to the user H via cartilage conduction. The sound outputting device 51 also includes the other side unit (not illustrated in FIG. 6) coupled to the opposite position of the side unit 53, that is, the other end portion of the front unit 52. The side unit at the opposite side of the side unit 53 has a structure similar to the above-mentioned structure. The side unit 53 includes a controller and the like inside.

Figure 7:
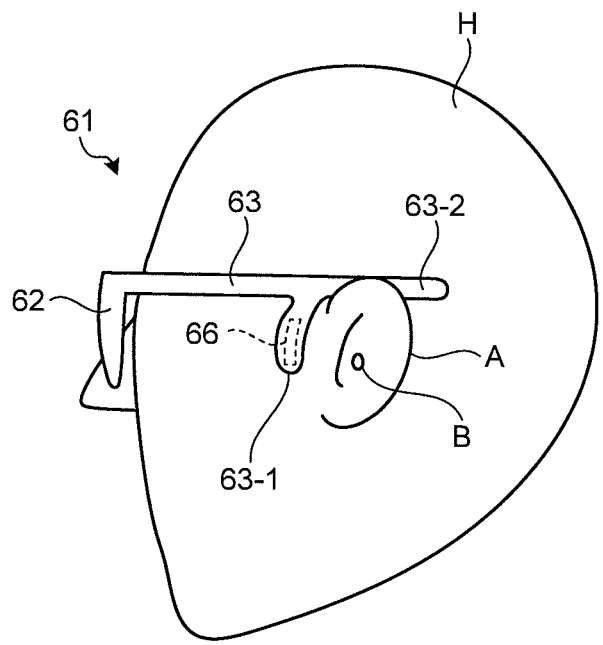
FIG. 7 is an explanatory side view illustrating a sound outputting device according to another embodiment mounted on a user.

A sound outputting device 61 in FIG. 7 is eyeglass-shaped, and includes a front unit 62 and a side unit 63 coupled to one end portion of the front unit 62. The side unit 63 branches at a position anterior to a portion supported by an ear A in a direction away from the front unit 62. One branched end portion 63-1 includes a piezoelectric speaker 66. The other branched end portion 63-2 is supported by the ear A. The one end portion 63-1 has a branched shape that contacts a region (the region of (iv) in FIG. 5) suitable for cartilage conduction around the external auditory canal B of user H's ear A. Accordingly, the piezoelectric speaker 66 arranged in the one end portion 63-1 suitably transmits sounds to the user H via cartilage conduction. The sound outputting device 61 also includes the side unit (not illustrated in FIG. 7) coupled to the opposite position of the side unit 63, that is, the other end portion of the front unit 62. The side unit at the opposite side of the side unit 63 has a structure similar to the above-mentioned structure. The side unit 63 includes a controller and the like inside.

Figure 8:
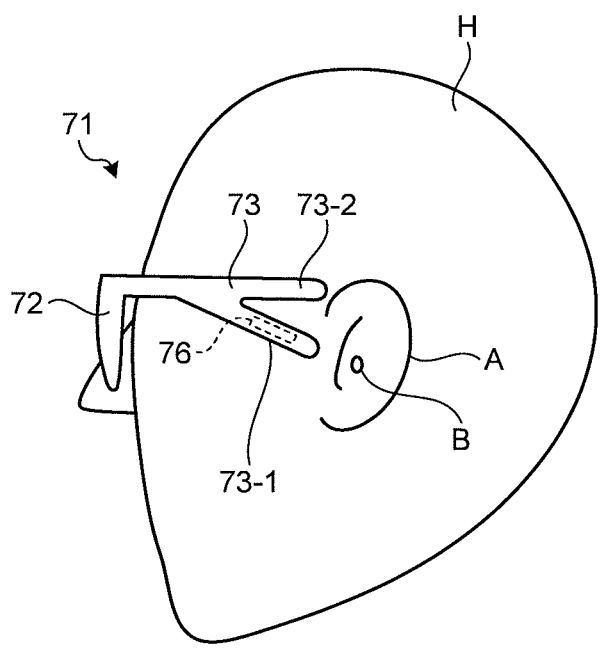
FIG. 8 is an explanatory side view illustrating a sound outputting device according to another embodiment mounted on a user.

A sound outputting device 71 in FIG. 8 is eyeglass-shaped, and includes a front unit 72 and a side unit 73 coupled to one end portion of the front unit 72. The side unit 73 branches at a position anterior to a portion supported by an ear A in a direction away from the front unit 72. One branched end portion 73-1 includes the piezoelectric speaker 76. The other branched end portion 73-2 extends adjacent to the ear A. The sound outputting device 71 is supported by both of one branched end portion 73-1 and the other branched end portion 73-2 so as not to fall to the downward direction of the head. In the embodiment, at the end portion of the side unit 73, which is coupled to the front unit 72, a spring for pressure adjustment and an adjuster for changing the angle are arranged. One end portion 73-1 has a branched shape that contacts a region (the region of (iv) in FIG. 5) suitable for cartilage conduction around the external auditory canal B of user H's ear A. Accordingly, the piezoelectric speaker 76 arranged in the one end portion 73-1 suitably transmits sounds to the user H via cartilage conduction. The sound outputting device 71 also includes the side unit (not illustrated in FIG. 8) coupled to the opposite position of the side unit 73, that is, the other end portion of the front unit 72. The side unit at the opposite side of the side unit 73 has a structure similar to the above-mentioned structure. The side unit 73 includes a controller and the like inside.

Figure 9:
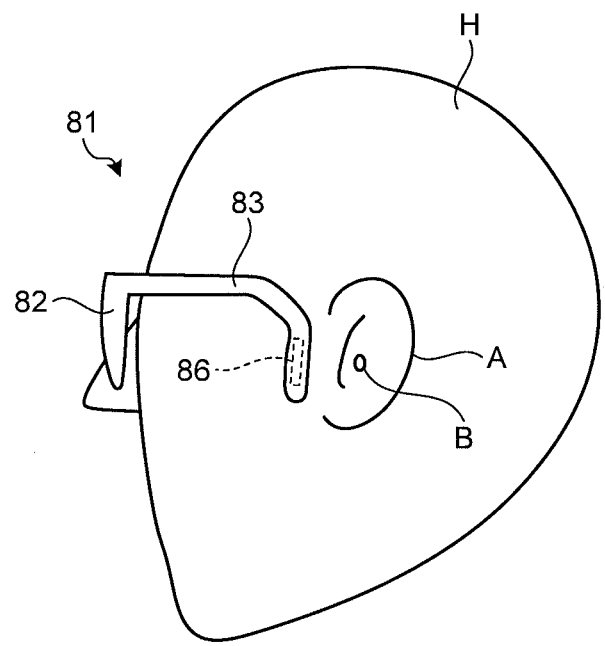
FIG. 9 is an explanatory side view illustrating a sound outputting device according to another embodiment mounted on a user.
Figure 10:
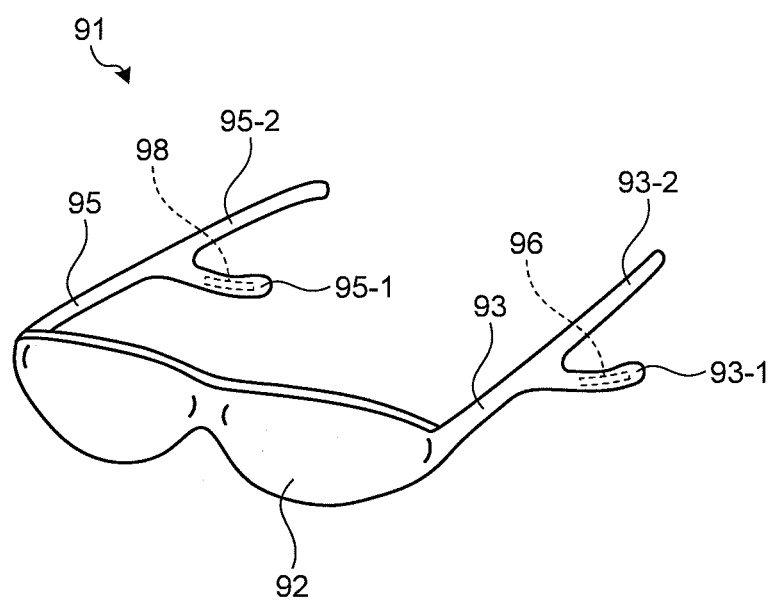
FIG. 10 is a perspective view illustrating a schematic configuration of a sound outputting device according to another embodiment.

A sound outputting device 81 in FIG. 9 is eyeglass-shaped, and includes a front unit 82 and a side unit 83 coupled to one end portion of the front unit 82. An end portion at the opposite side of the end portion, which is coupled to the front unit 82 of the side unit 83, has a shape curved toward a region (the region of (iv) in FIG. 5) suitable for cartilage conduction around the external auditory canal B of user H's ear A. The piezoelectric speaker 86 is arranged in the end portion of the side unit 83. The sound outputting device 81 is supported at a portion (a portion protruding at a position anterior to the ear A and close to eyes) where the side unit 83 contacts the temporal region of the user H so as not to fall to the downward direction of the head. In the embodiment, at the end portion of the side unit 83 coupled to the front unit 82, a spring for pressure adjustment and an adjuster for changing the angle are arranged. The above-described end portion of the side unit 83 has the shape curved toward the region (the region of (iv) in FIG. 5) suitable for cartilage conduction around the external auditory canal B of the user H's ear A. Accordingly, the piezoelectric speaker 86 arranged at the end portion suitably transmits sounds to the user H via cartilage conduction. The sound outputting device 81 also includes the other side unit (not illustrated in FIG. 9) coupled to the opposite position of the side unit 83, that is, the other end portion of the front unit 82. The side unit at the opposite side of the side unit 83 has a structure similar to the above-mentioned structure. The side unit 83 includes a controller and the like inside.

A sound outputting device 91 in FIG. 10 is eyeglass-shaped, and includes a front unit 92 and side units 93 and 95, which are coupled to respective end portions of the front unit 92. The side units 93 and 95 each branch at a position anterior to a portion supported by an ear A in a direction away from the front unit 92. One branched end portions 93-1 and 95-1 respectively include the piezoelectric speakers 96 and 98. The other branched end portions 93-2 and 95-2 are supported by the ears A. Specifically, the side units 93 and 95 each have the branched shape in the position anterior to the ear A, similarly to the above-described side unit 73 in FIG. 8. The side units 93 and 95 in FIG. 10 are longer than the above-described side units 73 in FIG. 8 such that the other end portions 93-2 and 95-2 of the side units 93 and 95 are supported by the ears A. One end portions 93-1 and 95-1 each have a branched shape that contacts a region (the region of (iv) in FIG. 5) suitable for cartilage conduction around the external auditory canal B of user H's ear A (not illustrated in FIG. 10). Accordingly, the piezoelectric speakers 96 and 98 respectively arranged in one end portions 93-1 and 95-1 suitably transmit sounds to the user H via cartilage conduction. The side units 93 and 95 include a controller and the like inside.

The eyeglass-shaped sound outputting device generates large mechanical vibration of the piezoelectric speaker (the cartilage conduction receiver). And thus, the vibration may be transmitted to the whole frame of glasses so that the sounds caused by this vibration of the whole frame may increase sound leakage to the surroundings. In view of this, the sound outputting device may be configured such that the piezoelectric speakers 26 and 28 are coupled to the frame of glasses via a cushioning member (a damper), which is made of soft material such as rubber, so as to decrease a portion vibrated largely.

Figure 11:
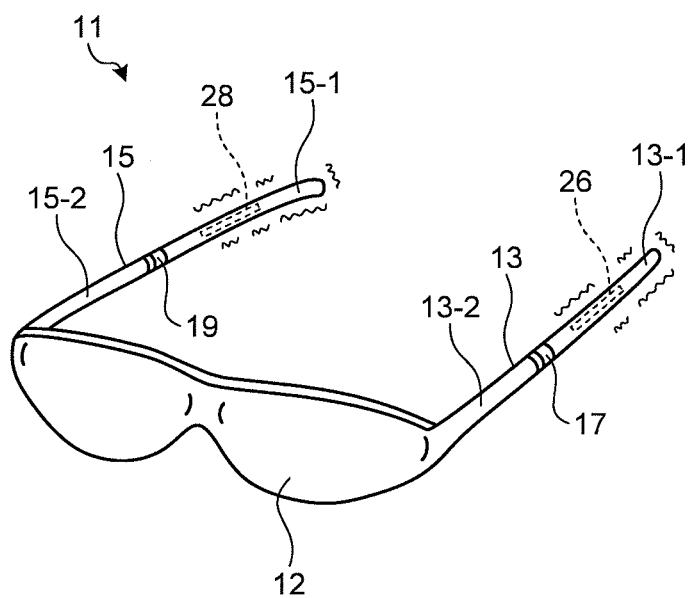
FIG. 11 is a perspective view illustrating a schematic configuration of a sound outputting device according to another embodiment.
Figure 12:
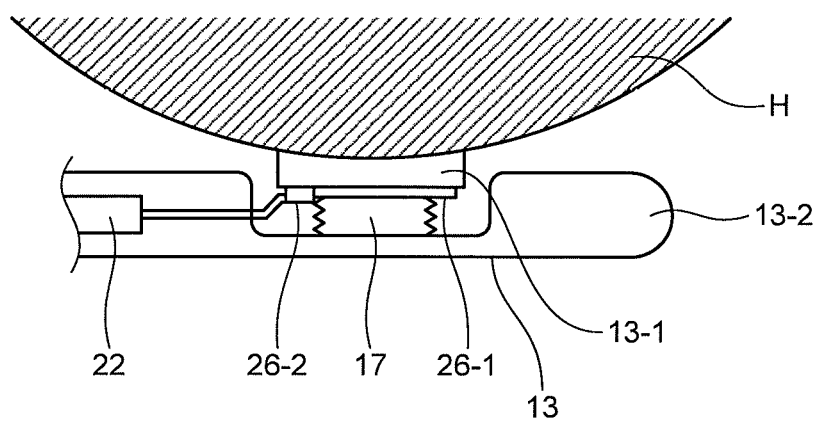
FIG. 12 is a cross-sectional view of a side unit of a sound outputting device illustrating a position of a cushioning member arranged on the side unit of the sound outputting device according to another embodiment.

With reference to FIGS. 11 and 12, an example of the sound outputting device 11 according to another embodiment that includes cushioning members 17 and 19 on the side units 13 and 15 will be described below. FIG. 11 is a perspective view illustrating a schematic configuration of a sound outputting device 11 according to another embodiment. FIG. 12 is a cross-sectional view of the side unit 13 illustrating a position of the cushioning member 17 arranged on the side unit 13 of the sound outputting device 11 according to another embodiment.

The sound outputting device 11 in FIG. 11 is eyeglass-shaped, and includes a front unit 12 and the side units 13 and 15 coupled to both end portions of the front unit 12. The side unit 13 is constituted of a first unit 13-1, which includes the piezoelectric speaker 26, arranged at one side and a second unit 13-2 arranged at the other side. The side unit 15 is constituted of a first unit 15-1, which includes the piezoelectric speaker 28, arranged at one side and a second unit 15-2 arranged at the other side. Between the first unit 13-1 and the second unit 13-2, the cushioning member 17 is arranged. Between the first unit 15-1 and the second unit 15-2, the cushioning member 19 is arranged. Accordingly, the cushioning members 17 and 19 reduce vibrations of the second units 13-2 and 15-2 caused by vibrations of the first units 13-1 and 15-1. That is, the sound outputting device 11 is configured such that the cushioning members 17 and 19 (the dampers) are arranged between the frames of glasses respectively, thus limiting portions to be vibrated. Accordingly, the sound outputting device 11 reduces sound leakage to the surroundings, which is caused by vibration of the whole frame of glasses with the piezoelectric speakers 26 and 28.

As illustrated in FIG. 12, the side unit 13 of the sound outputting device 11 may include the cushioning member 17 between the first unit 13-1 arranged at one side, which contacts the temporal region of the user H, and the second unit 13-2. The first unit 13-1 according to the embodiment is, for example, vibration transmitting rubber that includes the piezoelectric speaker 26 (including a vibrator 26-1 and an electrode unit 26-2). The piezoelectric speaker 26, which is arranged in the first unit 13-1, is coupled to a part of a circuit (for example, the control unit 22) arranged inside the second unit 13-2 through wiring material. The user H has a hearing sensitivity with individual difference. In the embodiment, the first unit 13-1, which contacts the temporal region of the user H, is constituted as a replaceable attachment, thus ensuring adjustment of height and firmness.

Figure 13A:
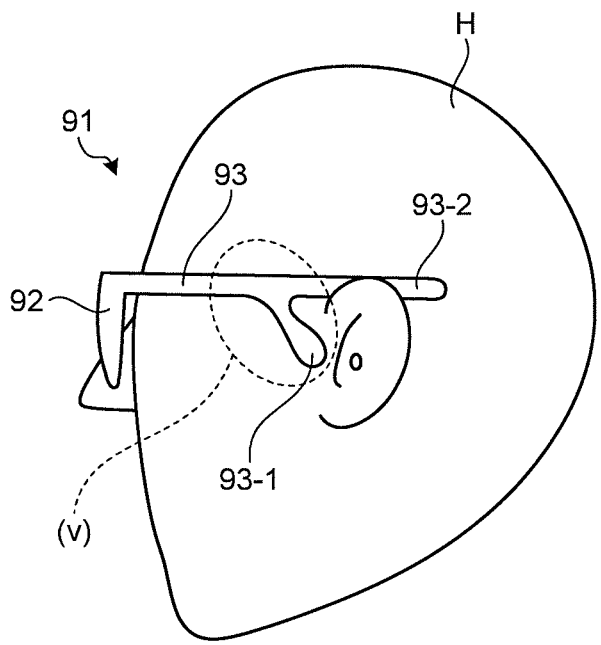
FIG. 13A is an explanatory side view illustrating the sound outputting device in FIG. 10 mounted on the user.
Figure 13B:
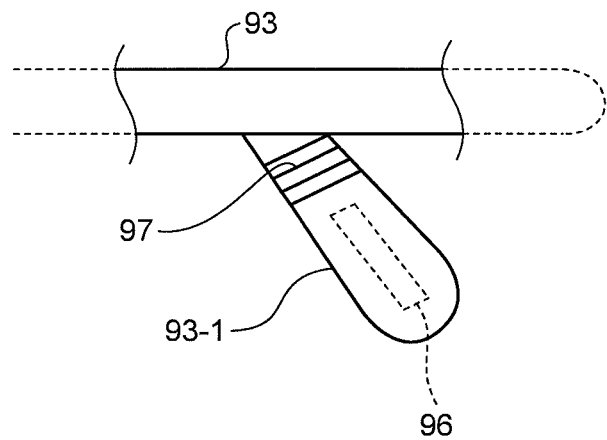
FIG. 13B is a transparent view of a side unit of the sound outputting device illustrating a position of a cushioning member arranged in the side unit of the sound outputting device in FIG. 13A.

An example of the sound outputting device 91 according to another embodiment that includes the cushioning member 97 in the side unit 93 will be described with reference to FIGS. 13A and 13B. FIG. 13A is an explanatory side view illustrating the sound outputting device 91 in FIG. 10 mounted on the user H. FIG. 13B is a transparent view of the side unit 93 illustrating a position of the cushioning member 97 arranged in the side unit 93 of the sound outputting device 91 in FIG. 13A.

The sound outputting device 91 in FIG. 13A represents an example where the sound outputting device 91 in FIG. 10 further includes the cushioning member 97 at the side unit 93, which is designed such that the first unit 93-1 is overlapped with a region suitable for cartilage conduction. Specifically, as illustrated in FIG. 13B illustrating the enlarged region of (v) in FIG. 13A, the cushioning member 97 is arranged between the side unit 93 and the first unit 93-1 where the piezoelectric speaker 96 is arranged. The first unit 93-1, which contacts the temporal region of the user H, may be constituted as a replaceable attachment so as to adjust height and firmness to accommodate the individual difference in cartilage position of the user H.

As described above, the embodiments provide the following advantageous effects. A user appears to merely wear glasses to others. Accordingly, for example, cutting the ambient sound noise, listening to music and programs, or the like is not noticed. For example, cartilage conduction by the piezoelectric speaker is used for listening to music and sounds. In this case, the external auditory canal is released, thus reducing a sense of discomfort caused by a conventional inner earphone, canal type earphone, and large headphone. Specifically, this reduces feeling of a foreign body in the ear holes, oppressive feeling of a headphone, and an uncomfortable sense of sweating. The external auditory canal is open, thus allowing the user to be aware of dangerous sound and call of other people. It is difficult for other people to notice the user to wear the earphone, thus ensuring an easy situation to talk to the user. Using cartilage conduction reduces the sound leakage to the surroundings. In conventional technique (for example, Japanese Patent Application National Publication (Laid-Open) No. 2005-534269), covering the external auditory canal (block the external auditory canal from the ambient) is a basic configuration. Covering the external auditory canal reduces ambient noise. On the other hand, in the embodiments, the external auditory canal is open. Actively preventing vibration of the eardrum by sound noise reduces ambient noise even in the case where the external auditory canal is open.

With the embodiments, the noise-cancelling function reduces loud sound in a stadium of a sport such as high school baseball and professional baseball. Thus, advantageous effects are provided that instructions from a manager, a coach, and other players are clear to hear. Further, instructions from a manager can be transmitted to players with wireless connection. When the user is in an office or an examination site for example, he/she is provided with a condition to concentrate without being bothered by ambient noise. When the user is in a vehicle such as an airplane and a train, he/she is provided with a comfortable condition because sound noise is reduced.

The embodiments employ an eyeglass shape as a shape of the sound outputting device, thus providing advantageous effects of combining, for example, corrective glasses for near sight and far sight or sunglasses with the sound outputting device.

With the embodiments, the external auditory canal is open, thus providing advantageous effects of using an ordinary earphone at the same time. In this case, noise cancellation is performed via cartilage conduction, thus having an effect of noise cancellation on the earphone with ordinary products. Thus, a risk of, for example, hearing loss caused by sound volume that is increased too much against large ambient noise is reduced.

In the case where the embodiments are employed in a phone call of, for example, a mobile phone, the microphones may be switched to receiving microphones. Thus, it is allowed to receive sounds at a position close to a mouth, and to provide products that are excellent in design as an advantageous effect. The employment of the embodiments in a phone call ensures transmission of telephone only removing ambient noise, thus having advantageous effects in an environment with large ambient sound.

The present invention provides effects for reducing the burden on a user's ear when using the sound outputting device.

What is claimed is:

1. A sound outputting device, comprising:
a front unit configured to be arranged in front of an eye of a user;
a first side unit configured to be coupled to one end portion of the front unit and to extend adjacent to one ear of the user;
a second side unit configured to be coupled to another end portion of the front unit and to extend adjacent to the other ear of the user;
a sound transmitting portion provided in at least one of the first side unit and the second side unit and configured to come in contact with the user; and
a piezoelectric speaker for vibrating the sound transmitting portion so as to transmit a sound to the user,
wherein
the sound transmitting portion is detachable from and replaceable with respect to the piezoelectric speaker associated with the first or second side unit where the sound transmitting portion is provided,
the sound transmitting portion is configured to be in contact with a cartilage of one of the ears of the user from outside of the ear, and
the sound transmitting portion is movable alternately to a first direction approaching the ear and to a second direction separating away from the ear.

2. The sound outputting device according to claim 1, further comprising
a sound signal generator provided in at least one of the first side unit and the second side unit for generating a sound signal to be supplied to the piezoelectric speaker.

3. The sound outputting device according to claim 1, wherein
the piezoelectric speaker has a rod-shape configured such that a direction where the piezoelectric speaker extends substantially coincides with a direction where the first or second side unit in which the piezoelectric speaker is provided extends.

4. The sound outputting device according to claim 1, wherein
the piezoelectric speaker is configured to move the sound transmitting portion alternately in the first direction toward the user and in the second direction away from the user so as to vibrate the sound transmitting portion.

5. The sound outputting device according to claim 1, wherein
at least one of the first side unit and the second side unit has, at a side far from the front unit, an end portion having a shape configured to be branched into two parts at a position anterior to the ear,
one of the part is provided with the piezoelectric speaker, and
the other part is configured to be supported by the ear.

6. The sound outputting device according to claim 1, wherein
the sound transmitting portion is a region configured to come in contact with the cartilage around an external auditory canal of the ear, and
the piezoelectric speaker is configured to transmit a vibration to the cartilage by vibrating the sound transmitting portion, so as to transmit the sound to the user via cartilage conduction.

7. The sound outputting device according to claim 1, further comprising:
a cushioning member provided between the sound transmitting portion and the first or second side unit in which the sound transmitting portion is not provided.

8. The sound outputting device according to claim 7, wherein
the cushioning member is configured to reduce transmission of vibration of the first unit to the second unit.

9. The sound outputting device according to claim 7, wherein
the piezoelectric speaker is configured to move the sound transmitting portion alternately in the first direction toward the user and in the second direction away from the user so as to vibrate the sound transmitting portion, and
the cushioning member is configured to reduce transmission of vibration of the sound transmitting portion in the first direction or in the second direction.

10. The sound outputting device according to claim 7, wherein
the piezoelectric speaker includes a vibrator, and a stator configured to secure the vibrator and control vibration with piezoelectricity, and
the vibrator is directly sandwiched between the cushioning member and the sound transmitting portion.

11. The sound outputting device according to claim 1, further comprising
a microphone provided in an end portion at a side of the front unit of at least one of the first side unit and the second side unit, the microphone being arranged to face an opposite side of the user.

12. The sound outputting device according to claim 11, further comprising
a noise cancelling controller configured to perform a noise cancelling process in which a sound signal of a sound obtained by the microphone is supplied to the piezoelectric speaker in an opposite phase.

13. The sound outputting device according claim 1, further comprising:
a display unit provided in the front unit and configured to display an image;
a signal generator configured to generate an image signal; and
a display controller configured to control a display of an image on the display unit based on the image signal generated by the signal generator.

14. The sound outputting device according to claim 13, wherein
the display unit is configured to display an image on a screen provided in the front unit.

15. The sound outputting device according to claim 13, wherein
the display unit includes a translucent member or a transparent member.

16. The sound outputting device according to claim 1, wherein
the piezoelectric speaker is coupled to a part of a circuit provided inside one of the first side unit and the second side unit.

17. The sound outputting device according to claim 1, further comprising:
a notification switch to control on and off of a phone call.

18. A sound outputting device, comprising:
a front unit;
a first side unit configured to be coupled to one end portion of the front unit;
a second side unit configured to be coupled to another end portion of the front unit;
a sound transmitting portion provided in the first side unit for transmitting a sound via cartilage conduction; and
a piezoelectric speaker configured to vibrate the sound transmitting portion,
wherein
the sound transmitting portion is detachable from and replaceable with respect to the piezoelectric speaker associated with the first side unit,
the sound transmitting portion is configured to be in contact with a cartilage of one of the ears of the user from outside of the ear, and
the sound transmitting portion is movable alternately to a first direction approaching the ear and to a second direction separating away from the ear.

19. The sound outputting device according to claim 18, wherein
the sound outputting device has an eyeglass-shape, and
the piezoelectric speaker has a rod-shape configured such that a direction where the piezoelectric speaker extends substantially coincides with a direction where the side unit in which the piezoelectric speaker is provided extends.

20. The sound outputting device according to claim 18, further comprising:
a cushioning member provided between the sound transmitting portion and the second side unit.

21. The sound outputting device according claim 18, further comprising a display unit provided in the front unit for displaying an image.

22. A sound outputting device, comprising:
a front unit configured to be arranged in front of an eye of a user;
a first side unit configured to be coupled to one end portion of the front unit and to extend adjacent to one ear of the user;
a second side unit configured to be coupled to another end portion of the front unit and to extend adjacent to the other ear of the user;

a sound transmitting portion provided in at least one of the first side unit and the second side unit and configured to come in contact with the user; and a piezoelectric speaker for vibrating the sound transmitting portion so as to transmit a sound to the user, wherein the sound transmitting portion is detachable from and replaceable with respect to the piezoelectric speaker associated with the first or second side unit where the sound transmitting portion is provided, the sound transmitting portion is configured to be in contact with a cartilage around an external auditory canal of one of the ears of the user from outside of the ear without covering an ear hole of the ear, and the sound transmitting portion is movable alternately to a first direction approaching the ear and to a second direction separating away from the ear.

* * * * *